(12) United States Patent
Yamamoto et al.

(10) Patent No.: US 7,707,403 B2
(45) Date of Patent: Apr. 27, 2010

(54) AUTHENTICATION METHOD, COMMUNICATION APPARATUS, AND RELAY APPARATUS

(75) Inventors: Masaaki Yamamoto, Yokohama (JP); Yoshiaki Hiramatsu, Yokosuka (JP); Tatsuaki Wakabayashi, Yokohama (JP); Kazuhiro Takagi, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 825 days.

(21) Appl. No.: 10/297,696

(22) PCT Filed: Dec. 11, 2001

(86) PCT No.: PCT/JP01/10835

§ 371 (c)(1),
(2), (4) Date: Dec. 5, 2002

(87) PCT Pub. No.: WO02/49268

PCT Pub. Date: Jun. 20, 2002

(65) Prior Publication Data

US 2003/0140226 A1    Jul. 24, 2003

(51) Int. Cl.
H04L 9/32    (2006.01)
(52) U.S. Cl. .................................................. 713/156
(58) Field of Classification Search ................. None
See application file for complete search history.

(56) References Cited

U.S. PATENT DOCUMENTS 5,408,506 A * 4/1995 Mincher et al. ............. 375/134
5,657,390 A   8/1997 Elgamal et al.
5,825,890 A   10/1998 Elgamal et al.
5,918,041 A * 6/1999 Berstis ....................... 713/503
5,953,423 A   9/1999 Rosen (Continued)

FOREIGN PATENT DOCUMENTS

JP    03-271959 A    12/1991

(Continued)

OTHER PUBLICATIONS

Brown, K. "Web Security: Putting a Secure Front End on Your COM+ Distributed Applications"; *Microsoft Developer Network Magazine Japanese Edition*, 2000, vol. 4, No. 6, pp. 57-70 (translation included).

(Continued)

*Primary Examiner*—Matthew B Smithers
*Assistant Examiner*—David J Pearson
(74) *Attorney, Agent, or Firm*—Brinks Hofer Gilson & Lione (57) ABSTRACT

Included are Gateway server GWS which clocks the precise present time, and portable phone MS which performs a packet communication through gateway server GWS and IP server W. Portable phone MS acquires the time information from gateway server GWS, at the time of starting communication with IP server W and corrects, on the basis of this time information, the clocking present time of its own portable phone MS so that it is more precise. In addition, portable phone MS decodes a public key certificate (an electronic certificate issued by Certificate Office C for the public key certificate of IP server W) using the public key of Certificate Office C. Then the portable phone MS judges whether it is within the validity period specified in the public key certificate, using the corrected present time of its own portable phone MS.

13 Claims, 7 Drawing Sheets

U.S. PATENT DOCUMENTS

| | | | |
|---|---|---|---|
| 6,223,291 B1 * | 4/2001 | Puhl et al. ............... | 726/28 |
| 6,757,823 B1 * | 6/2004 | Rao et al. ............... | 713/153 |
| 6,889,212 B1 * | 5/2005 | Wang et al. ............... | 705/59 |
| 7,194,092 B1 * | 3/2007 | England et al. ............ | 380/262 |
| 2001/0052071 A1 | 12/2001 | Kudo et al. | |
| 2002/0029200 A1 * | 3/2002 | Dulin et al. ............... | 705/67 |
| 2002/0184493 A1 * | 12/2002 | Rees ............... | 713/158 |

FOREIGN PATENT DOCUMENTS

| | | |
|---|---|---|
| JP | 4-24815 | 1/1992 |
| JP | H05-257837 | 10/1993 |
| JP | H07-015421 A | 1/1995 |
| JP | 8-314568 | 11/1996 |
| JP | H08-287020 | 11/1996 |
| JP | H08-315021 A | 11/1996 |
| JP | 9-83608 | 3/1997 |
| JP | H10-285140 | 10/1998 |
| JP | 11-27721 | 1/1999 |
| JP | 11-136230 A | 5/1999 |
| JP | H11-174956 | 7/1999 |
| JP | 2000-65966 | 3/2000 |
| JP | 2000-307639 | 11/2000 |
| JP | 2002-520911 T2 | 7/2002 |
| WO | WO 9856179 A1 * | 12/1998 |
| WO | WO 00/02358 A1 | 1/2000 |
| WO | WO 00/64093 | 10/2000 |

OTHER PUBLICATIONS

Japanese Office Action mailed Feb. 20, 2007.

Office Action issued May 29, 2007 in the Japanese Patent Application No. 2003-378061 (with translation).

Office Action in related Japanese Application No. 2000-378061, dated May 19, 2009, 6 pages.

Mills, David L., "Network Time Protocol (Version 3)—Specification, Implementation and Analysis", Network Working Group, IETF Standard, Internet Engineering Task Force, University of Delaware, Mar. 1992, 107 pages.

European Search Report for European Application No. 01270977.0, dated Sep. 25, 2009, 4 pages.

Trial Decision from counterpart Japanese Application No. 2000-378061, dated Dec. 15, 2009, 18 pages (with translation).

* cited by examiner

AUTHENTICATION METHOD, COMMUNICATION APPARATUS, AND RELAY APPARATUS

TECHNICAL FIELD

The present invention relates to a certification method for judging the authenticity of the communication party, a communication device and a relay device to realize the certification method.

BACKGROUND ART

Various certification methods for judging the authenticity of correspondents have been in existence for a long time. Many certification methods suitable to a communication system utilizing an open network for the general public such as the Internet have been developed in recent years. A digital sign method using public key cryptography is one kind of certification method, which is widely used. In the digital sign method, a sender who enciphers a plaintext by a secret key owned exclusively by the sender, transmits the enciphered text, which a recipient decrypts using the sender's public key. If the decryption is successful, the recipient can be certain that the decrypted plaintext was transmitted by the sender.

A successful decryption through a correct matching of the secret key and the public key can be achieved; however, in order to ensure that a high level of security is maintained, it is necessary to guarantee that the public key belongs to the real sender. This guarantee is realized by a public key certification, which is enciphered by the secret key owned exclusively by an impartial party, i.e., a Certifying Authority. That is to say, in the instance the recipient holds a public key of the Certifying Authority, and the sender transmits the above enciphered data along with the sender's own public key certificate acquired from the Certifying Authority, the recipient firstly verifies the authenticity of the public key certificate using the Certifying Authority's public key. And secondly, decrypts the enciphered data using the sender's public key included in the authenticated public key certificate. Sender's public key used here is guaranteed by Certificate Authority. Therefore the success of the decryption on the above-enciphered data means nothing else than a guarantee by Certificate Authority that the sender of the enciphered data is authentic.

The public key certificate issued by the Certifying Authority includes the date and time information on the validity period of the certificate; and the receiver of the above enciphered data and the public key certificate used by the recipient determines whether the present time is within the validity period in the public key certificate with reference to a clocking present time in the receiver. The receiver naturally determines that the public key certificate is authentic, if the present time is within the validity period of the public key certificate.

Precise clocking of the receiver is necessary to maintain a high level of security since imprecise clocking makes an inprecise judgement regarding the validity period of the public key. Deviations in the clocking present time of communication devices, such as currently existing personal computers, inevitably occur and deviations are gradually enlarged, even though a user of the communication device may start clocking at the precise present time. In other cases, a user may forget the initialization of the clocking time, or a completely false in the initialization. In such a case, wrong present time is clocking in the receiver. Without a precise clocking of the present time it is impossible to judge with accuracy, the validity period of a public key certificate. The problem of the incorrect clocking of present time affects not only the authenticity of the public key cryptography method, but uniformly affects all certifying methods having a validity period for the certificate.

DISCLOSURE OF INVENTION

It is an object of the present invention to provide a certifying method, which is able to maintain the high level of security required, along with a communication device and a relay device to realize this certifying method.

To achieve the above purpose, the present invention provides a certifying method comprising: a transmission step by a relay device for transmitting time information corresponding to the clocking present time of said relay device to a communication device when said communication device starts communication with another communication device through said relay device; a correction step by said communication device for correcting the clocking present time of said communication device on the basis of said time information transmitted in said transmission step and received by said communication device; a relay step by said relay device for relaying certificate information with a certificate validity period, said certificate information being transmitted from said other communication device to said communication device, and certifying the authentication of said other communication device or said other communication device user; a judgment step by said communication device for judging whether the present time is within the validity period specified in said certificate information relayed in said relay step and received on the basis of said present time of the concerned communication device corrected in said correction step; and a certificate step for judging the authentication of said other communication device or said other communication device user by said communication device through the judgment result in said judgment step and said certificate information.

In addition, this invention provides a communication device communicating through a relay device with another communication device, comprising: clocking means for clocking the present time; receiving means for receiving certificate information, for the authentication of another communication device or another communication device user, with certificate validity period from said other communication device through said relay device, and receiving time information from said relay device to correct the clocking present time of said clocking means so that it is more precise at the start of communication with said other communication device; correction means for correcting the clocking present time of said clocking means on the basis of the received time information through said receipt means; judgment means for judging whether the present time is within the validity period specified in the certificate information received through said receipt means on the basis of the corrected present time clocked by said clocking means corrected through said correction means; certifying means for judging the authentication of said other communication device or said other communication device user using the judged result of said judgment means and said certificate information; and determination means for determining the propriety of the communication with said other communication device in accordance with the certificate result of said certificate means.

According to the invention, a communication device corrects its own clocking present time through the time information received from the relay device and judges on the basis of a more precise, corrected present time, whether it is within the validity period of the certificate specified in the certificate information needed for certifying the communication party.

In addition, this invention provides a relay device to relay communication between one communication device and another communication device, comprising: clocking means for clocking the present time; receiving means for receiving a connection request to demand the start of communication with said other communication device; generation means for generating the time information, to correct the clocking present time of said communication device so that it is more precise, on the basis of the clocking present time of said clocking means, when said receiving means receives said connection request; and transmission means for transmitting the time information generated by said generation means to said communication device.

According to this invention, when the relay device receives a connection request for starting communication with another communication device, the relay device generates the time information and transmits the time information to the communication device for correcting the clocking present time of the communication device so that it is more precise.

In addition, this invention provides a relay device to relay communication between one communication device and other communication device, comprising: clocking means for clocking the present time; receiving means for receiving a connection request from said communication device to demand the start of communication with said other communication device; generation means for generating the time information, to correct the clocking present time of said other communication device so that it is more precise on the basis of the clocking present time of said clocking means, when said receiving means receives said connection request; and transmission means for transmitting the generated time information by said generation means to said other communication device.

According to this invention, the relay device, on receiving a connection request for starting communication with another communication device, generates the time information for correcting the clocking present time of the other communication device so that it is more precise; and transmits the time information to the other communication device.

BEST MODE FOR CARRYING OUT THE INVENTION

Referring to the drawings, an embodiment will be described in accordance with the present invention as follows:

(1) Total Configuration

Figure 1:
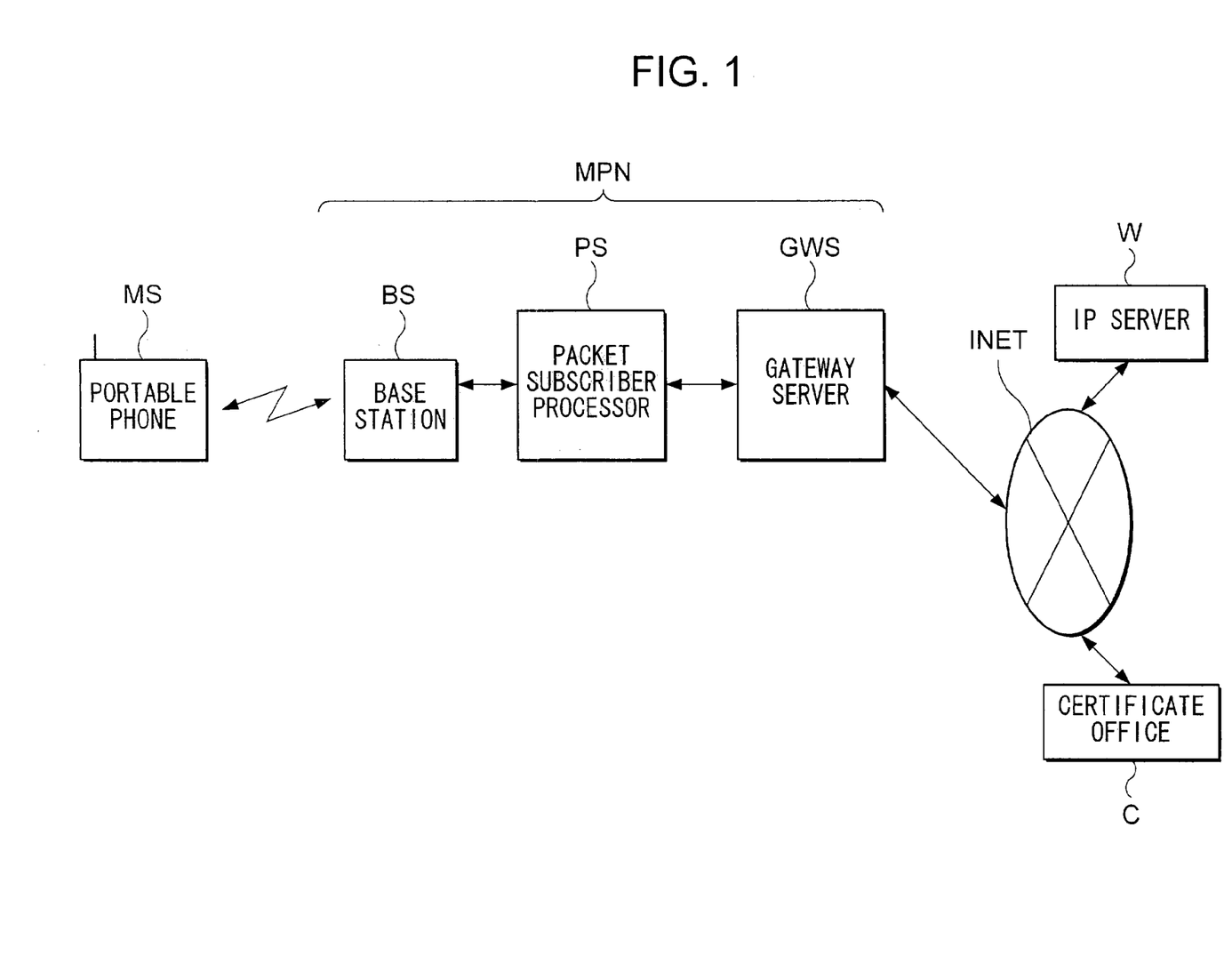
FIG. 1 is a diagram showing a total configuration of the communication system to which the certifying method is applied in one embodiment of the present invention.

FIG. 1 is a diagram showing the total configuration of the communication system applying the certifying method of the present invention. This communication system provides the WWW (World Wide Web) service to portable phone MS with a browsing function.

In this figure, portable phone MS is a mobile device receiving a packet communication service provided by the mobile packet communication network MPN. Portable phone MS is served by the mobile packet communication network MPN and other mobile phone networks of which the drawings are omitted. The mobile phone network is a communication network providing a general communication service for a mobile phone to the portable phone MS. In addition, the portable phone supports the SSL (Secure Sockets Layer) communication protocol for the packet transmission and receipt. SSL is a communication protocol stipulating e.g., certificate/data encryption between a server and a client. In the communication through SSL (SSL communication hereinafter in this description), a method of enciphered communication with a common key is performed after certifying the communication party through the public key encryption method.

Mobile packet communication network MPN includes plural base stations BS, plural packet subscriber processors PS, a gateway server GWS, and interconnecting communication lines. Base station BS telecommunicates with portable phones MS stationed in its own BS radio zone. Packet subscriber processor PS is a computer system in a packet subscriber switching office having plural base stations BS to relay packets between portable phones MS and gateway server GWS.

Gateway server GWS is a computer system in a mobile packet gateway switch & transit office interconnecting mobile packet communication network MPN with other communication systems, e.g., Internet INET. Gateway server GWS is managed by a communication business entity, which runs mobile packet communication network MPN. This communication business entity works as an impartial third party for the SSL communication between portable phones MS and IP server W. In addition, gateway server GWS functions as a so-called proxy server, and performs a protocol conversion between different networks, a communication relay, and so on. To be more precise, the conversion of the communication protocol means, an interconversion between a data link protocol for a mobile packet communication network MPN and a data link protocol for Internet INET, e.g., TCP/IP (Transmission Control Protocol/Internet Protocol), HTTP (Hyper Text Transfer Protocol), and so forth. In addition, gateway server GWS has a tunneling function. The contents of SSL communication cannot be grasped by gateway server GWS during SSL communication through the gateway server between portable phone MS and IP server W, and the gateway server works merely as a router.

IP sever W is a server connecting to Internet INET and provides clients such as portable phone MS with WWW service. Furthermore, IP server W supports SSL, and can perform SSL communication with portable phone MS. In addition, IP server W holds its own secret key, a public key, and a public key certificate issued by Certificate Office C. IP server W returns Server Hello Message and Server Certificate Request Message with its own public key certificate to portable phone MS, when IP server receives Client Hello Message in SSL communication from portable phone MS through Internet INET.

Certificate Office C is an impartial third party realized as a server connecting to Internet INET. The Certificate Office issues and manages an electronic certificate such as a public key certificate. For example, Certificate Office C returns an electronic certificate or a public key of Certificate Office C to the requesting party in response to a request from portable phone MS or IP Server W. Furthermore, the public key certificate issued by Certificate Office C contains date & time information with the validity period for the public key certificate. The date & time information of the public key certificate is set up by Certificate Office C.

(2) Configuration of Portable Phone MS

Figure 2:
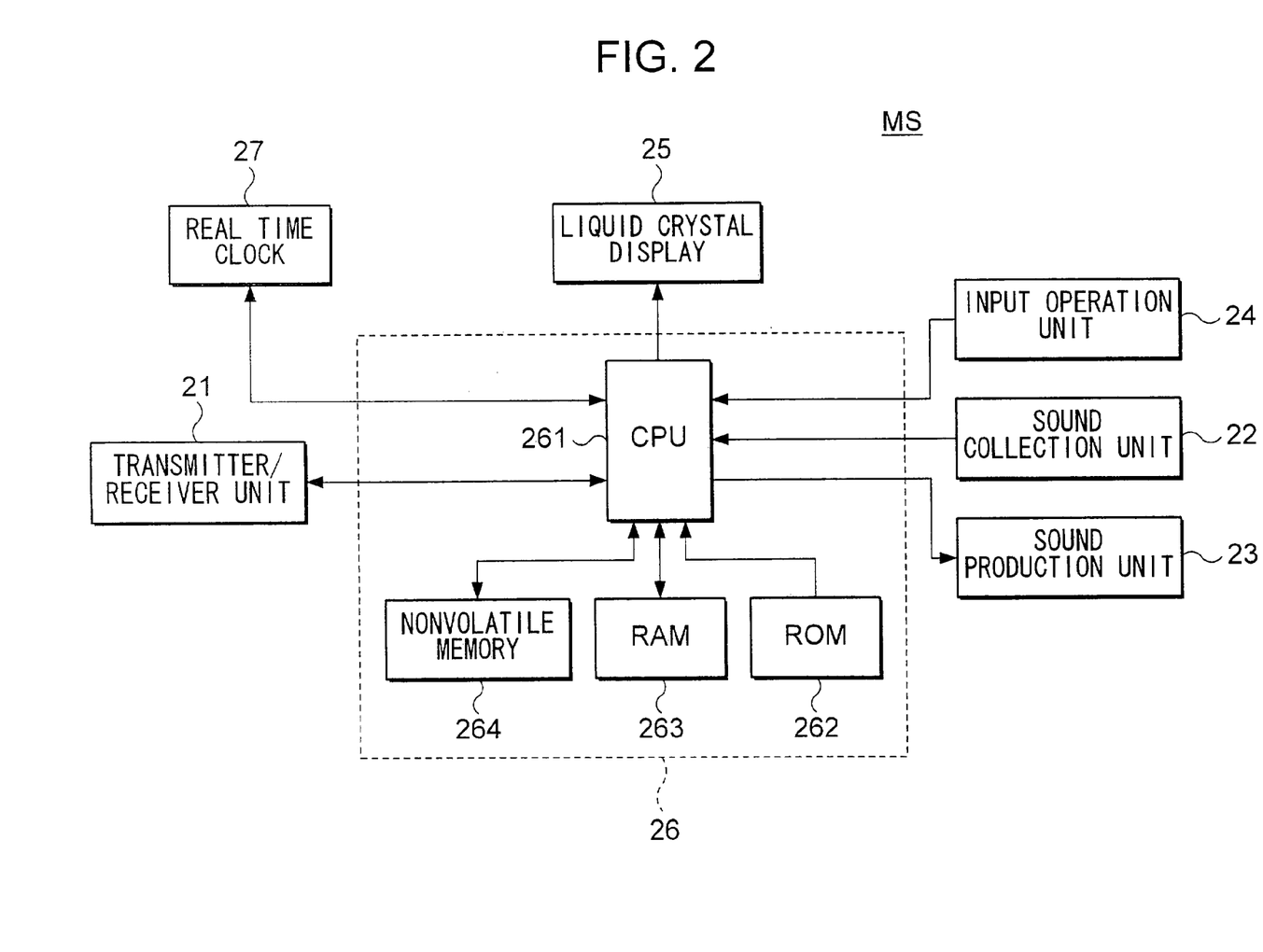
FIG. 2 is a block diagram showing a hardware configuration of portable phone MS, which composes the communication system.

FIG. 2 is a block diagram showing a hardware configuration of a portable phone MS. As shown in FIG. 2, the portable phone MS comprises a transmitter/receiver unit 21 (equipped with, an antenna, a radio unit, a transmitter, and a receiver) for telecommunicating with a base station BS; a sound pickup unit 22 (e.g. a microphone) for picking up sounds; a sound production unit 23 (equipped with, an amplifier and a speaker) for producing sound; an input operation unit 24 for inputting numerals, characters, and so on; a liquid crystal display 25 with a display area; a real time clock 27 for clocking the present time; and a controller 26 for controlling these units.

Controller 26 comprises CPU (Central Processing Unit) 261 for various controls; ROM (Read Only Memory) 262 for storing software such as a browser; SSL communication processing program and other necessary information to connect with a gateway server GWS etc.; RAM (Random Access Memory) 263 to be used as a work area of CPU 261; and nonvolatile memory 264 for storing various information such as the public key of Certificate Office C. Furthermore, one or more types of encryption algorism and one or more types of compression algorism for portable phone MS are stored in ROM 262 or in nonvolatile memory 264.

CPU 261 reads out and implements software stored in ROM 262, and controls ROM 262, RAM 263, nonvolatile memory 264, and each part of portable phones MS 21-25 & 27, when the electric power is applied to portable phone MS. In addition, CPU 261 implements the SSL communication program stored in ROM 262 when a user inputs a command through input unit 24 to start SSL communication. CPU 261 first transmits a message to gateway server GWS in accordance with SSL communication program to request SSL communication starting with the communication party (e.g. IP server W) indicated by user's input operation. In addition, CPU 261 receives a message responding to the above message from gateway server GWS by transmitter/receiver unit 21, and corrects, through the time information contained in the concerned message, the clocking present time of real time clock 27 so that it is more precise.

Furthermore, CPU 261 performs certification operation for the communication party on the basis of the public key certificate contained in a server certificate request message which is received by transmitter/receiver unit 21, the public key of Certificate Office C and the more precisely corrected clocking present time of real time clock 27, the certification operation including judgement whether the present time is within the validity period of the public key certificate. And CPU 261 continues SSL communication, only when the communication party is authenticated in the certification operation.

(3) Configuration of Gateway Server GWS

Figure 3:
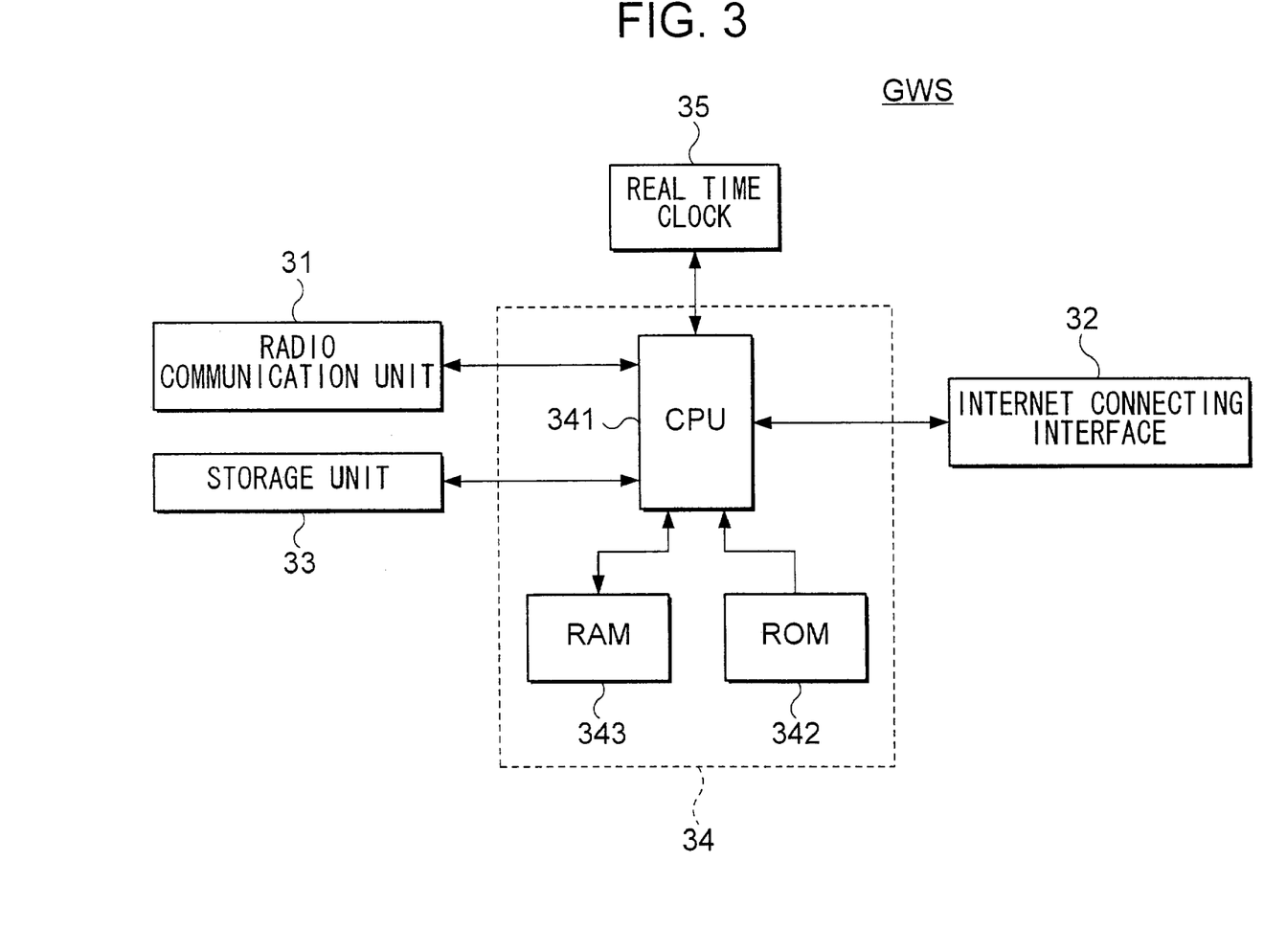
FIG. 3 is a block diagram showing a hardware configuration of gateway server GWS.

FIG. 3 is a block diagram showing a hardware configuration of gateway server GWS. As shown in FIG. 3, gateway server GWS comprises radio communication unit 31 for communicating with portable phone MS through base station BS, and packet subscriber processing unit PS, internet connecting interface 32 for communicating with IP server W etc. through Internet INET, rewritable storage unit 33 for storing various programs and data (e.g. semiconductor disk, hard disk), real time clock 35 for clocking the present time, and control unit 34 for controlling these units.

Real time clock 35 clocks the precise present time. There are methods, such as NTP (Network Time Protocol), to precisely maintain the present time clocked by real time clock 35. Furthermore, in this embodiment, gateway server GWS acquires the time information through a dedicated line (drawing omitted) from a device clocking the precise present time, e.g., Certificate Office C and corrects the registered time of real time clock 35 using the concerned time information.

Control unit 34 comprises CPU 341 for various controls, ROM 342 and RAM 343. CPU 341 controls ROM 342, RAM 343 and the units 31-33 & 35 of the gateway server by reading out and implementing programs stored in ROM 342 or storage device 33.

In addition, CPU 341 measures transmission delay time of mobile packet communication network MPN from gateway server GWS to portable phone MS, which transmits a request message for starting SSL communication and stores the delay time in RAM 343. Furthermore, CPU 341 establishes TCP connection between portable phone MS, which is a sender of this message, and IP server W, which is a communication party with this portable phone MS, when CPU 341 receives a request message for starting SSL communication through radio communication device 31. In addition, CPU 341 generates time information by adding the transmission delay time of mobile packet communication network MPN to the clocking present time of real time clock 35. The time information is for correcting the present time clocked by real time clock 27 of portable phone MS so that it is punctual. CPU 341 transfers a message containing the time information to radio communication unit 31 to transmit the information to portable phone MS, which requires the starting of SSL communication.

(4) Configuration of IP Server W

Figure 4:
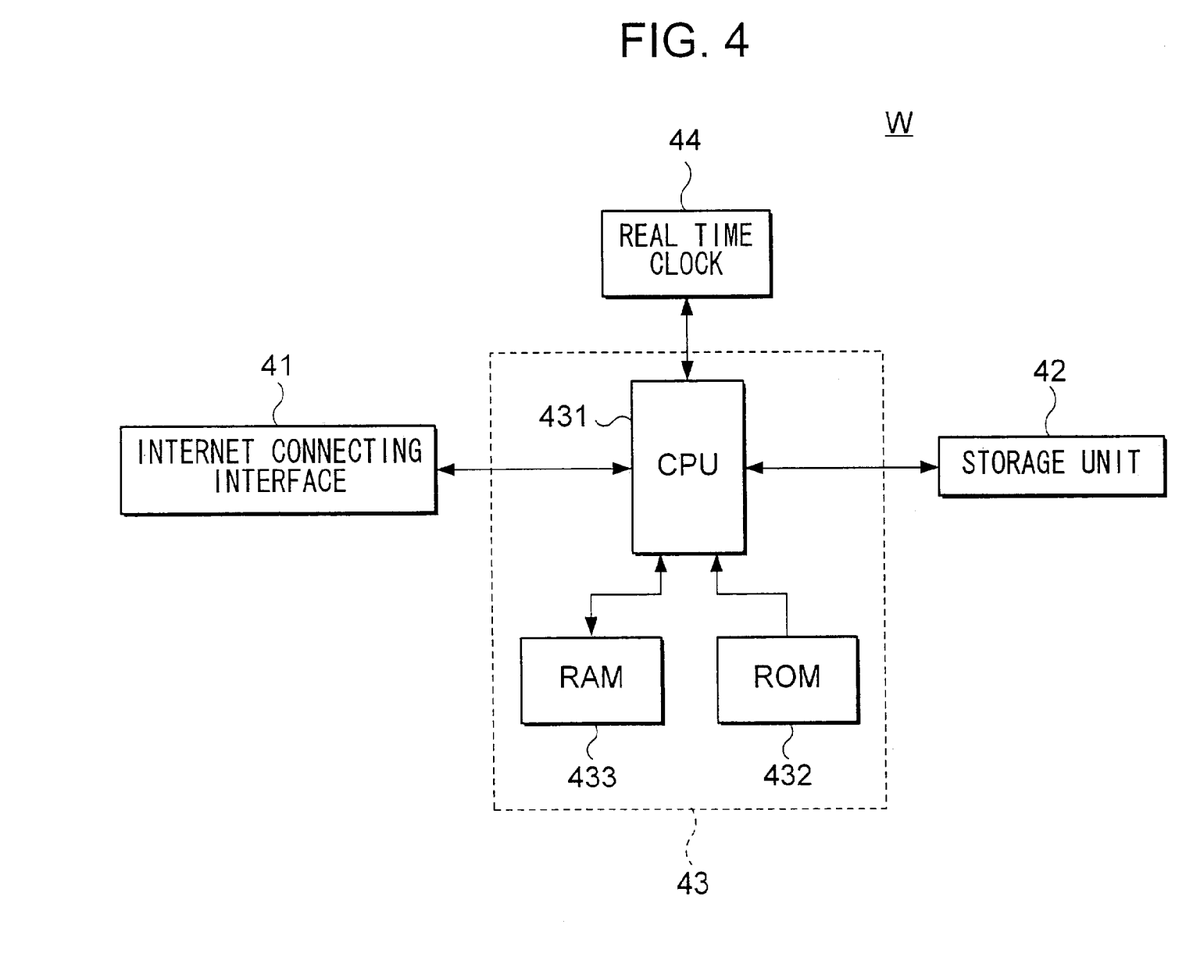
FIG. 4 is a block diagram showing a hardware configuration of IP server W, which composes the communication system.

FIG. 4 is a block diagram showing a hardware configuration of IP server W. As shown in FIG. 4, IP server W comprises Internet connecting interface 41 for communicating through Internet INET with gateway server GWS; rewritable storage unit 42 for storing various contents, secret key & public key of IP server W, SSL communication processing program etc.; real time clock 44 for clocking the present time; and control unit 43 for controlling these units.

Control unit 43 comprises CPU 431 for various controls, ROM 432 and RAM 433. Furthermore, one or more types of encryption algorithms and one or more types of compression algorithms are stored in ROM 432 or storage unit 42 to be used by IP server W.

CPU 431 controls ROM 432, RAM 433 and units 41-42,44 of IP server W by reading out and carrying out programs stored in ROM 432 or storage unit 42. In addition, CPU 431 starts SSL communication processing program, when CPU 431 receives a client-hello message through interface 41 connecting to the Internet.

In accordance with the SSL communication processing program, CPU 431 first specifies one or more types of encryption algorithms and compression algorithms for the common usage of IP server W and portable phone MS on the basis of encryption algorithms and compression algorithms stored in ROM 432 or storage device 42, and, correspondingly, on the basis of encryption algorithms and compression algorithms designated by the above client hello message. Second, CPU 431 chooses an encryption algorithm and a compression algorithm to be used for SSL communication with portable phone MS among the specified encryption algorithms and compression algorithms. Then CPU 431 generates a server hello message, which reports the chosen encryption algorithm and the chosen compression algorithm, and transfers to the concerned server, the server hello message through the Internet, connecting interface 41 to the client hello message sender, i.e., portable phone MS, as a return.

Furthermore, CPU 431 transfers a request message for a server certificate with a public key certificate of IP server W stored in storage device 42 through Internet connecting interface 41 to the client hello message sender, i.e., portable phone MS.

(5) Operation

The operations of portable phone MS, gateway server GWS and IP server W, which are performed for portable phone MS and IP server W to start SSL communication, will be explained with reference to FIGS. 5-8. Note that the above-mentioned operations are carried out only after CPU 261 started the SSL communication program, and note that CPU 341 of gateway server GWS has already calculated and stored in RAM 343 the transmission delay time through mobile packet communication network MPN. In addition, the secret key of IP server W and the public key certificate should have been stored in the storage device 42 of IP server W. Certificate Office C should have issued the public key certificate for the public key, which matches with the secret key. Furthermore, the public key of Certificate Office should have been stored in nonvolatile memory 264 of portable phone MS.

Figure 5:
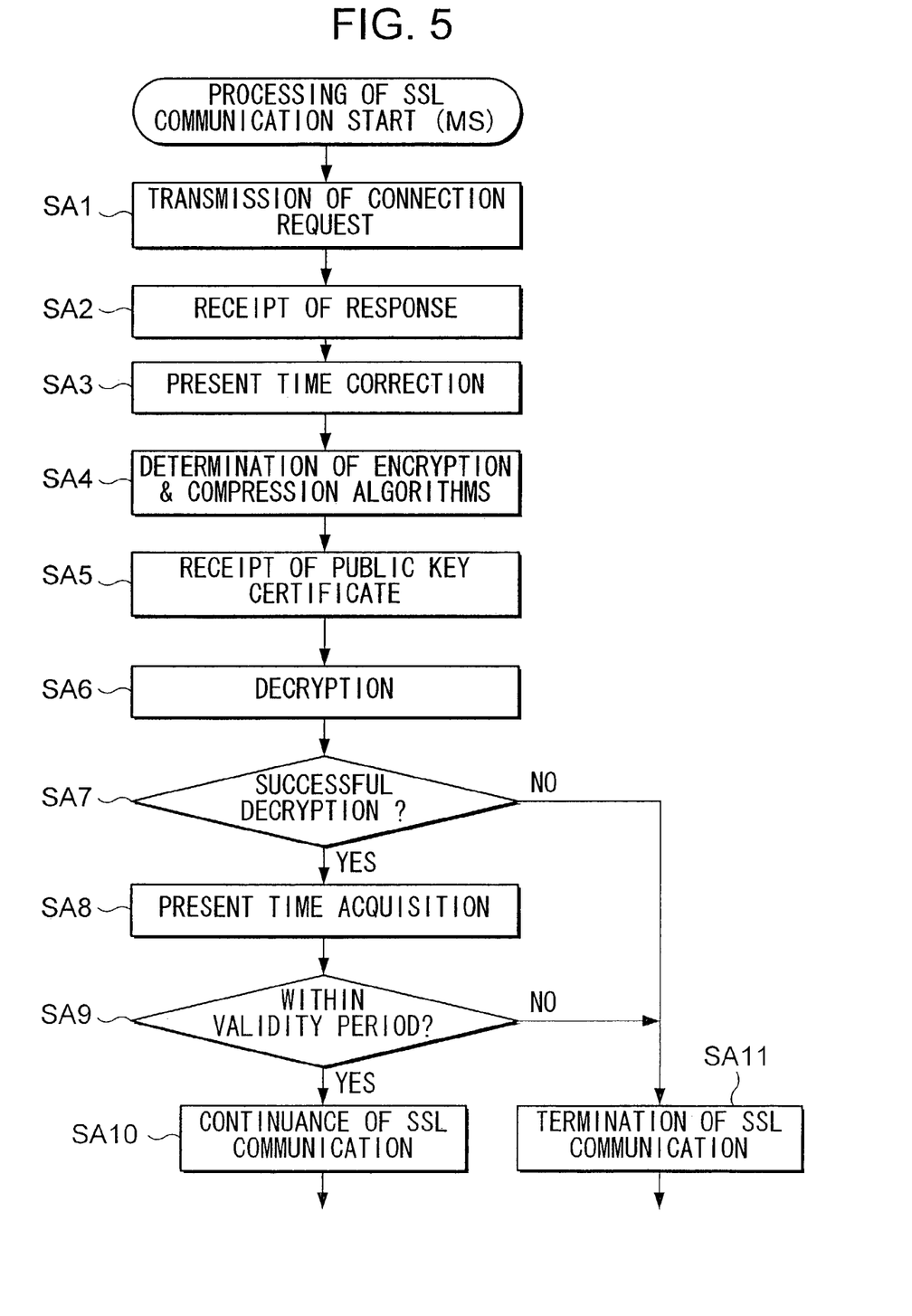
FIG. 5 is a flowchart showing in one embodiment a processing flow, which is implemented by portable phone MS at the time of starting SSL communication.

When a user of portable phone MS inputs an instruction into input unit 24 to communicate with IP server W, CPU 261 of portable phone MS implements SSL communication program stored in ROM 262 for the processing shown in FIG. 5. Namely, CPU 261 first generates a request message (e.g. "Connect https:// . . . ") for SSL communication with IP server W designated by the user. Then CPU 261 transfers the concerned message through transmitter/receiver unit 21 to gateway server GWS (Step SA1). As a result, message m1 is sent from portable phone MS to gateway server GWS as shown in FIG. 8.

Figure 6:
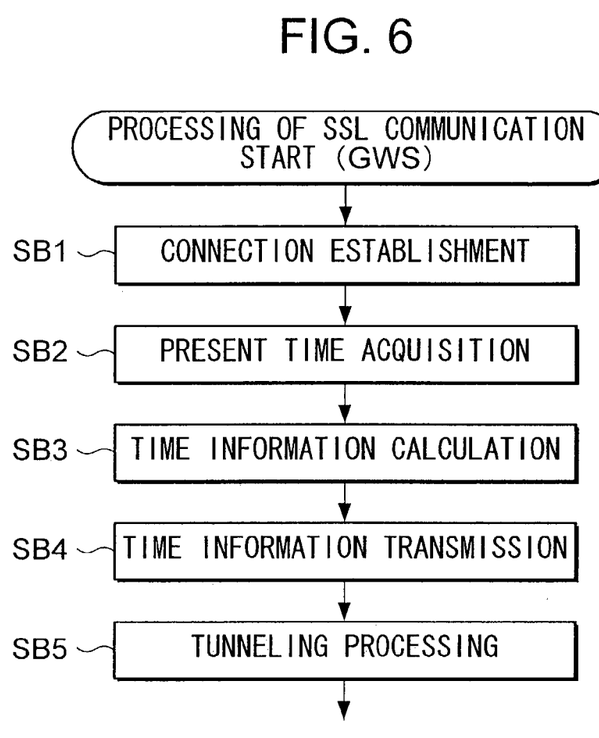
FIG. 6 is a flowchart showing in one embodiment a processing flow, which is implemented by gateway server GWS at the time of starting SSL communication.
Figure 8:
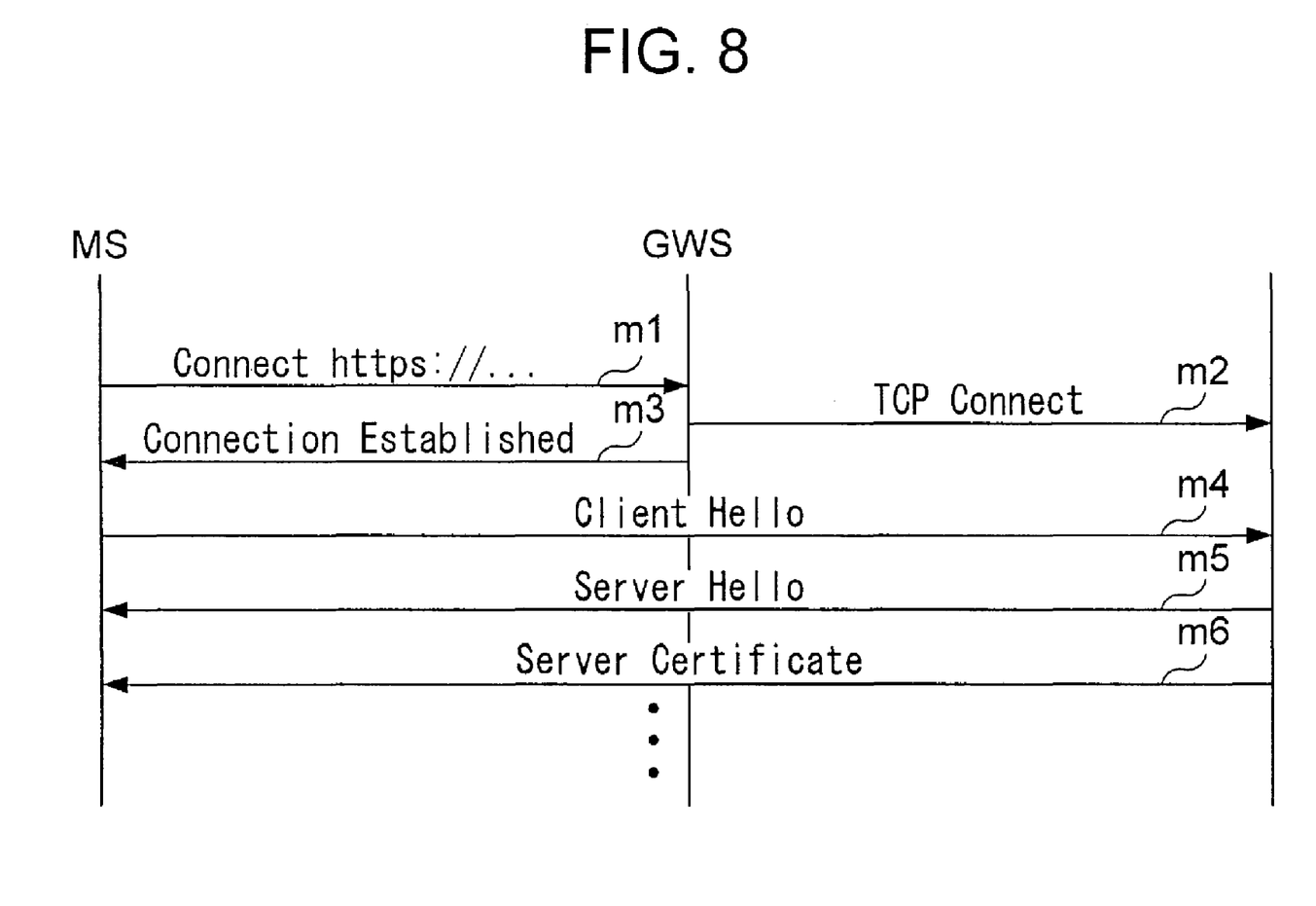
FIG. 8 is a sequence diagram showing in one embodiment a flow of the signals, (a message) up to the time of starting SSL communication by portable phone MS with IP server W.

First, CPU 341 of Gateway server GWS establishes a TCP connection between portable phone MS and IP server W as shown in step SB1 in FIG. 6, when CPU 341 receives message m1 through radio communication unit 31 (message m2 in FIG. 8). Second, CPU 341 acquires the clocking present time of real time clock 35 (step SB2). In addition, CPU 341 acquires the transmission delay time stored in RAM 343. Then CPU 341 adds the concerned transmission delay time to the present time acquired in the above step SB1, and thereby generates the time information indicating a time which is after the present time by the transmission delay (step SB3). Next, CPU 341 generates message m3 containing the generated time information and transfers the concerned message m3 through radio communication unit 31 to portable phone MS (step SB4). As a result, message m3 is transmitted from gateway server GWS to portable phone MS as shown in FIG. 8 as a response message to message m1, showing the establishment of a TCP connection. Hereafter, gateway server GWS performs only the packet relay through the tunneling function concerning the TCP connection communication (step SB5).

When CPU 261 of portable phone MS receives message m3 through transmitter/receiver unit 21 (step SA2 in FIG. 5), CPU 261 corrects the clocking present time of real time clock 27 through the time information contained in message m3. As a result, the clocking present time of real time clock 27 is corrected so that it is more precise.

Next, CPU 261 of portable phone MS performs a processing concerning the determination of encryption algorithm and compression algorithm for SSL communication. To be more specific, CPU 261 generates client-hello message m4 to notify IP server W of encryption algorithm and compression algorithm for the usage of portable phone MS. As a result, the client-hello message is transmitted from portable phone MS to IP server W through TCP connection established between portable phone MS and IP server W, as shown in FIG. 8.

Figure 7:
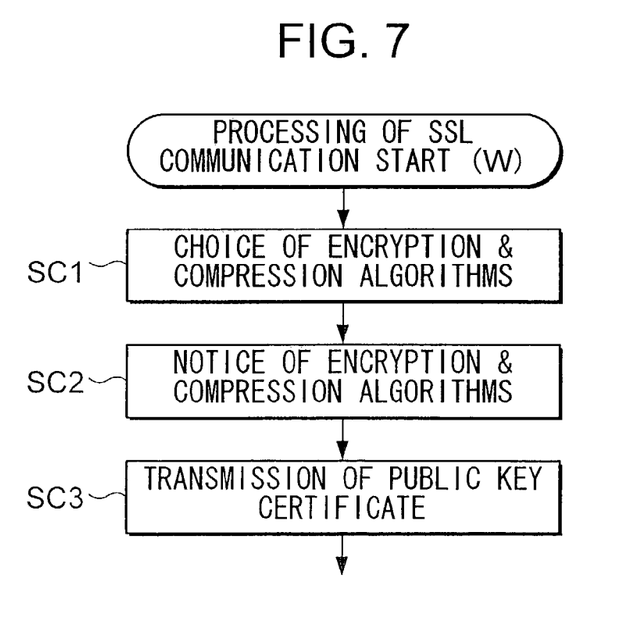
FIG. 7 is a flowchart showing in one embodiment a processing flow, which is implemented by IP server W at the time of starting SSL communication.

First, CPU 431 of IP server W specifies one or more types of encryption algorithms and one or more types of compression algorithms for the common use of IP server W and portable phone MS on the basis of encryption algorithms and compression algorithms stored in ROM 432 or storage unit 42, and correspondingly, on the basis of encryption algorithms and compression algorithms designated by message m4 as shown in step SC1 in FIG. 7, when CPU 431 receives message m4 through Internet connecting interface 41. Second, CPU 431 chooses the encryption algorithm and the compression algorithm for SSL communication with portable phone MS among the specified encryption algorithms and the specified compression algorithms (step SC1). Then, CPU 431 generates message m5 to notify portable phone MS of the chosen encryption algorithm and the chosen compression algorithm. Next, CPU 431 transfers the concerned message m5 through the Internet connecting interface 41 to portable phone MS (step SC2). As a result, message m5 is returned from IP server W through the TCP connection to mobile phone MS as shown in FIG. 8.

CPU 261 of mobile phone MS determines the encryption algorithm and the compression algorithm designated by message m5 as the encryption algorithm and the compression algorithm for SSL communication with IP server W (step SA4).

On the other hand CPU 431 of IP server W transmits message m5 to portable phone MS and then reads out public key certificate of IP server W from storage unit 42. Then, CPU 431 generates message m6 containing read-out public key certificate and transfers the concerned message m6 through the Internet connecting interface 41 to portable phone MS (step SC3). As a result, message m6 is transmitted from IP server W through a TCP connection to portable phone MS as shown in FIG. 8.

When CPU 261 of portable phone MS receives message m6 through transmitter/receiver unit 21 (step SA5), CPU 261 deciphers public key certificate in message m6 by the public key of Certificate Office C stored in non-volatile memory 264 (Step SA6). If the decryption is successful (step SA7), CPU 261 acquires the clocking present time of real time clock 27 corrected in the above-mentioned step SA3 (step SA8). Then, CPU 261 judges whether it is within the validity period specified in the deciphered public key certificate. Namely, CPU 261 determines whether the present time acquired in step SA8 is within the validity period set up in the public key certificate (step SA9). If the present time is within the validity period, CPU 261 continues SSL communication, as the public key certificate is the authentic public key certificate which validity period has not yet expired and which is guaranteed by Certificate Office C (step SA10). Therefore, only subsequently, is the enciphered communication performed between portable phone MS and IP server W. On the contrary, if the decryption is not successful in step SA6 (step SA7: No), or if the successful decryption finds out that the validity period of the public key certificate has expired (step SA9: No), CPU 261 judges that certifying IP server W has failed. Then CPU 261 displays a message, which shows the failure of certifying IP server W and the reason for the failure, on liquid crystal display 25. Furthermore, the failure & the reason for the failure message of IP server W's certificate can be output as a voice message from voice unit 23. Then, CPU 261 transfers a command to disconnect TCP connection through transmitter/receiver 21 to gateway server GWS (step SA11), following which, the TCP connection established between portable phone MS and IP server W is disconnected, resulting in the termination of the SSL communication.

As explained above, in this embodiment, portable phone MS corrects its own clocking present time through the time information received from gateway server GWS just before the certificate processing is carried out for IP server W. As a result, portable phone MS can judge with a greater precise present time whether the present time is within the validity period specified in the public key certificate of IP server W. This means that, portable phone MS can perform the certification of IP server W more precisely. Enough high security can be obtained herewith concerning the communication party certificate through the procedure carried out in the present embodiment. As a natural result additionally mentioned, there is an advantage that the clocking present time of real time clock 27 can be maintained with precision in portable phone MS.

Furthermore, gateway server GWS generates time information to correct the present time clocked by portable phone MS in consideration for the transmission delay time through mobile packet communication network MPN. Therefore, a more precise present time can be set up in portable phone MS excluding accidental errors of the transmission delay time.

The embodiments of the present invention were explained heretofore, however, this invention may be embodied in various forms without departing from the essential characteristics or spirit of the invention; the above embodiment being only illustrative, not restrictive. The scope of the invention is defined by the claims and all the transformations and changes within the equivalent scope of the claims belong to this invention. Following is a transformation example:

[Modification]

In the above embodiment, portable phone MS is exemplified as a client of SSL communication. However, also applicable are PDA (Personal Digital Assistants) and portable communication terminals such as mobile computers, PHS (Personal Handy phone System). A client can be, for instance, a terminal system combining a portable phone with a mobile computer, or a terminal system combining a radio communication terminal and a cable communication terminal with non-mobile computer.

In addition, the above embodiment exemplifies a public key certificate as certificate information with a validity period. However, the above certificate information can be an electronic key, an ID, or a password and so on.

The above-mentioned embodiment, describes a method for correcting the clocking present time of a portable phone MS, which is corrected in order to certify the communication party (IP server W) by portable phone MS. In another given example, the communication party (portable phone MS) can be certified by IP server W wherein, the clocking present time of real time clock 44 of IP server W is corrected by the time information generated from gateway server GWS. In this example, gateway server GWS measures the transmission delay time through a communication channel from gateway server GWS to IP server W and generates the time information according to the transmission delay time. In addition, when portable phone MS and IP server W authenticate each other, the clocking present time of the real time clocks 27, 44 of both portable phone MS and IP server W are corrected on the basis of the time information generated by gateway server GWS.

Furthermore, the function for measuring transmission delay can be set up in portable phone MS instead of gateway server GWS. Then, gateway server GWS can notify portable phone MS of the clocking present time of real time clock 35 without making any delay compensation, and portable phone MS can correct the clocking present time of real time clock 27 so that it is precise on the basis of the notified present time and the measured transmission delay. This type is especially effective for the communication carried out through the Internet or a network utilizing communication satellites etc., in which the transmission delay time greatly varies depending on the communication channel.

The above-mentioned embodiment describes an instance, in which time information is included in a return message m3 (response message) of gateway server GWS in response to request message m1 of portable phone MS, which demands SSL communication. However, gateway server GWS can send another type of message, which consists of only time information, to portable phone MS upon receipt of the above message m1. However, the number of messages will be fewer in the above embodiment, since the time information is contained in a response message between portable phone MS and gateway server GWS, and consequently the traffic congestion of mobile communication network MPN will be reduced.

In addition, in the above embodiment, portable phone MS corrects the clocking present time of real time clock 27 using received time information from gateway server GWS and judges whether it is within the validity period specified in the public key certificate by the corrected present information. However, portable phone MS can directly use the time information itself (the present time information) from gateway server GWS for judging whether it is within the validity period. In this case, even a communication device without a real time clock or any other clocking measures can judge whether it is within the validity period specified in the public key certificate.

In another modification of the above-mentioned embodiment of the present invention, the sender of the time information is limited to gateway server GWS; and no other communication device apart from gateway server GWS can change the clocking present time of portable phone MS. Therefore, the high level of security is maintained. In this case, ID information of the gateway server GWS such as the network address is stored in non-volatile memory 264 in portable phone MS to identify the gateway server, which is permitted to transmit the time information to portable phone MS. CPU 261 of the portable phone identifies the sender gateway server of the time information received by transmitter/receiver unit 21, by comparing the packet sender address with the network address of gateway server GWS stored in non-volatile memory 264.

The above-mentioned embodiment of this invention is one example of an application of SSL communication. However, it is possible that this invention is applicable to various communication types with public encryption methods. Furthermore, the purpose of this invention is to judge, by the precise present time, whether the certificate is within its specified validity period, in the instance that a validity period of the certificate information certifying the communication party is established. In which case, the implementation of the enciphered communication is not an essential condition.

The invention claimed is:

1. A method for initiating a secured communication between a first node and a second node, the method implemented by the first node comprising:
   requesting establishment of connection with the second node to a server being operable for connecting the first node and the second node for communication therebetween;
   subsequent to requesting establishment of connection and preceding to beginning a first session of communication with the second node, receiving from the server a connection notice notifying establishment of a connection with the second node, wherein the connection notice is generated by the server and includes present time information generated by the server;
   receiving an expirable certificate from the second node; and
   verifying the certificate against its expiration, based on the received present time information.

2. A method according to claim 1, wherein receiving a connection notice comprises adjusting a timer of the first node, using the present time information included in the connection notice.

3. A method according to claim 1, wherein verifying the certificate comprises authenticating the second node.

4. A method according to claim 3, wherein authenticating the second node comprises decrypting the certificate, using a public key of the second node.

5. A method according to claim 1, wherein the first and second nodes are located in different networks.

6. A mobile terminal connectible to a network for communication with a second node, comprising:
   a CPU and a memory for storing programs executable by the CPU to implement:
   a connection control configured to request establishment of connection with the second node to a server being operable for connecting the first node and the second node for communication there between;
   a time control configured to receive from the server, subsequent to requesting establishment of connection and preceding to beginning a first session of communication with the second node, a connection notice notifying establishment of connection with the second node, wherein the connection notice is generated by the server and includes present time information generated by the server;
   a certificate receiver configured to receive an expirable certificate from the second node; and
   an authentication control configured to verify the certificate against its expiration, based on the received present time information.

7. A mobile terminal according to claim 6, wherein the time control comprises a timer adjuster configured to adjust a timer of the first node, using the present time information included in the connection notice.

8. A mobile terminal according to claim 6, wherein the authentication control authenticates the second node by decrypting the certificate, using a public key of the second node.

9. A mobile terminal according to claim 6, wherein the second node is located in a second network different from the network.

10. A server comprising:
    a CPU and a memory for storing programs executable by the CPU to implement:
    a connection control configured to operate for connecting a first node and a second node in response to a connection request from the first node; and
    a timer configured to generate present time information,
    wherein the connection control transmits to the first node a connection notice notifying establishment of the connection with the second node, subsequent to establishment of the connection between the first node and the second node but preceding to tunneling a first session of communication between the first node and the second node, wherein the connection notice is generated by the server and includes the present time information also generated by the server, and the present time information is to be used at the first node to verify a certificate from the second node against its expiration.

11. A server according to claim 10, wherein the first and second nodes are located in different networks.

12. A method implemented by a server to initiate a secured communication between a first node and a second node, comprising:
    operating for connecting a first node and a second node in response to a connection request from the first node;
    generating present time information; and
    transmitting to the first node a connection notice notifying establishment of the connection with the second node, subsequent to establishment of the connection between the first node and the second node and preceding to tunneling a first session of communication between the first node and the second node, wherein the connection notice is generated by the server and includes the present time information, and the present time information is to be used at the first node to verify a certificate from the second node against its expiration.

13. A method according to claim 12, wherein the first and second nodes are located in different networks.

* * * * *